United States Patent [19]
Hardwick et al.

[11] 3,938,725
[45] Feb. 17, 1976

[54] METHOD OF MAKING ARTICLES SUCH AS ELECTRICALLY INSULATED HOUSINGS USING STRIPED LAMINATES

[75] Inventors: John H. Hardwick; William H. Jagoe; Carl W. Tonnesen, all of Salem; Harold W. Jesse, Amherst, all of N.H.

[73] Assignee: TME Corporation, Salem, N.H.

[22] Filed: Jan. 4, 1974

[21] Appl. No.: 430,679

[52] U.S. Cl. ............ 228/155; 113/120 UE; 156/224
[51] Int. Cl.² ......................................... B63B 19/00
[58] Field of Search .......... 29/472.9, 480, 481, 627, 29/592, 475; 113/120 A, 116 P, 120 UE; 156/554, 211, 217, 224, 196

[56] References Cited
UNITED STATES PATENTS

| | | | |
|---|---|---|---|
| 696,709 | 4/1902 | Bossert | 113/116 P |
| 2,819,195 | 1/1958 | Huber | 156/554 |
| 2,980,159 | 4/1961 | Greene | 156/554 |
| 3,547,722 | 12/1970 | Andersson | 156/196 |

*Primary Examiner*—Al Lawrence Smith
*Assistant Examiner*—Robert C. Watson
*Attorney, Agent, or Firm*—Brumbaugh, Graves, Donohue & Raymond

[57] ABSTRACT

Articles, such as wholly or partly insulated housings for electrical and electronic components, are made from bands composed of a relatively wider strip of one material and a relatively narrower strip of a second material laminated to each other, the band thus being "striped" in that it has one zone constituted by a laminate of materials and at least one other zone constituted by solely the first material. The articles are shaped and blanked in the band so that predetermined parts of the article are formed from only the first material and the rest of the article is formed from the laminate of the two materials.

5 Claims, 4 Drawing Figures

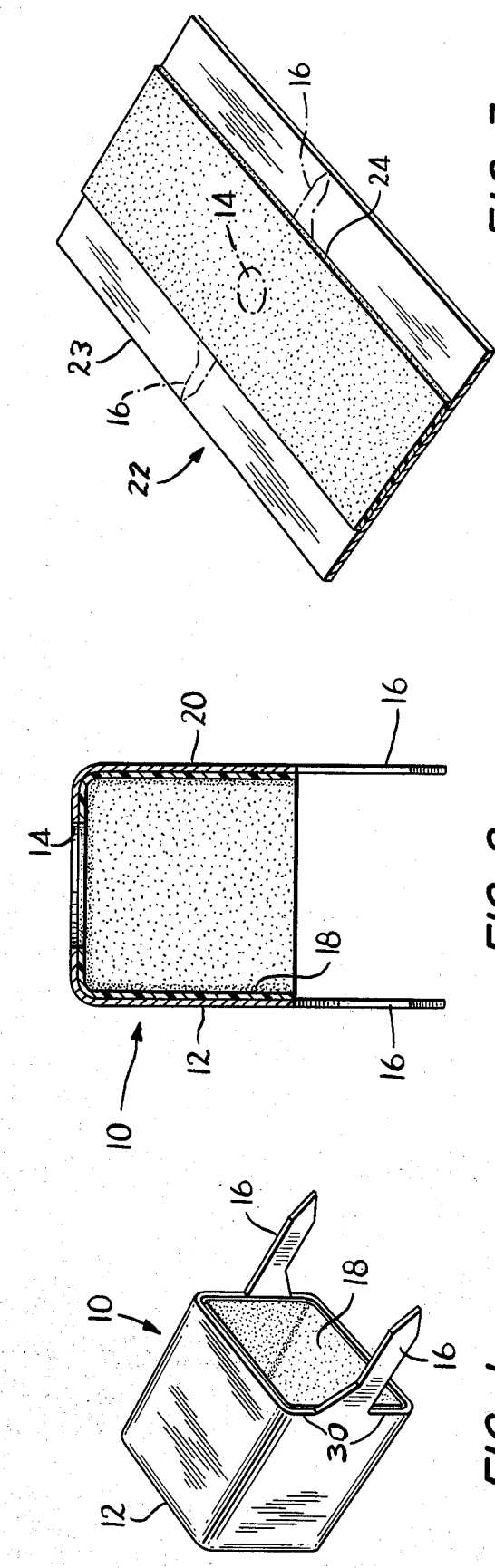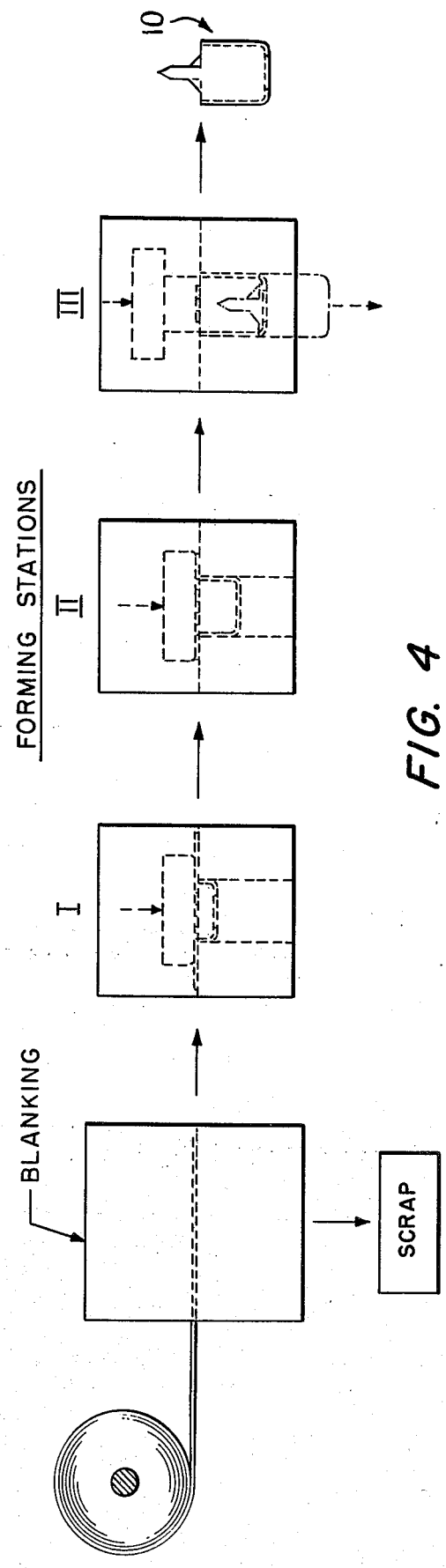

METHOD OF MAKING ARTICLES SUCH AS ELECTRICALLY INSULATED HOUSINGS USING STRIPED LAMINATES

BACKGROUND OF THE INVENTION

Many articles made from sheet materials are composed of parts containing different materials, each material being desirably present to impart one or more specific properties to the article. For example, housings for electronic or electric components may comprise an electrically insulating part for electrically isolating the component it houses and an electrically conducting part for shielding or for making a desired electrical connection. Small anti-friction bearings often have a structural part for transferring the forces of the journaled part to a mounting and an anti-friction part carried by the structural part for engaging and carrying the journaled part. Frequently, an article composed of two or more materials is made by assembling it from separate parts, each of which is made exclusively of the appropriate material. Another way of making such an article is to make one part and then coating, casting, or molding the other part in situ on the first part. Occasionally, a two-material article is made from a laminate of the two materials by first shaping the article and then removing one material from selected zones.

The manufacture of insulating or shielding housings for electric or electronic components provides a good example of the state of the art. At one time, almost all such articles were made by assembling separately produced conductive parts and non-conductive parts. Even now, most ordinary light bulb sockets have an inner conductive sleeve into which the bulb is screwed and a separate outer insulating sleeve that telescopically receives the conductive part. Shields for electronic components, such as IF cans and transistor housings, are now usually made by either forming a cup-like member of conductive material and spraying or otherwise applying an insulating coating on the inside of the can or by forming the cup-like member from a laminate of a conducting material and an insulating material and then removing the insulating material from the solder lugs. Various articles of two or more materials may also be made by first producing individual blanks composed of a substrate sheet and then adding a selective coating (or coatings) of another material printed, deposited with a screen or stencil or otherwise formed in desired zones.

The techniques described above, though adequate as far as achieving a desired end product is concerned, are relatively complicated and costly. The tooling and labor involved in making separate parts and then assembling them, in casting or coating in situ on formed parts, in selectively removing material or in making and processing individual blanks adds greatly to the time, costs and quality control problems involved in a production operation, as compared with the manufacture of a single part of one material.

SUMMARY OF THE INVENTION

There is provided, in accordance with the present invention, a novel and improved method of making an article containing different materials in different parts that provides substantially the same time and cost efficiencies as making a single part of one material while producing an article with different materials in different parts that is of the same or better quality than can be produced by the techniques heretofore known (such as those described above) for making articles containing different materials in different parts. More particularly, the method, according to the invention, comprises the steps of forming a long band composed of at least a first strip of one sheet material and a second strip of a second sheet material laminated together, each strip being of uniform length and the first strip being wider than the second strip. The second strip is positioned on the first strip such that the band has at least one first longitudinally continual zone constituted by only the first strip of material and at least one second longitudinally continual zone constituted by a laminate of both strips. The articles are formed from the band by shaping and blanking the band and controlling the shaping and blanking to locate the first zone of the band in a first predetermined part of the article and the second zone of the band in a second predetermined part of the article.

For example, a housing for use in electronic equipment to shield electronic components and constructed to be soldered to a circuit board may be manufactured from a strip of an electrically conductive material and a strip of an electrically insulating material, the strip of insulating material being of a lesser width than the strip of electrically conductive material and being laminated to the strip of conductive material with its axis centered on the axis of the strip of conductive material, thereby leaving portions along each edge of the band of conductive material. The shield is made by shaping and blanking it from the band to produce a cup-like body containing the laminate portion of the band with the insulation within the body and one or more solder lugs consisting solely of the conductive material extending from the end of the body. Since the lugs are entirely free of insulating material, a 360° solder connection to the circuit board is ensured.

The method of the invention is susceptible of use in the manufacture of a wide variety of products using many materials. The band from which the articles are made may be manufactured by various laminating techniques well known to those skilled in the art. Similarly, the shaping and blanking of the products from the band can be practiced in a variety of ways, again within the present skill of the art. The selection of the materials, laminating techniques and the shaping and forming operations is, therefore, a matter that need not be described in detail herein, except by way of examples given hereinafter.

For a better understanding of the invention, reference may be made to the following description of an exemplary embodiment, taken in conjunction with the figures of the accompanying drawing.

BRIEF DESCRIPTION OF THE DRAWING

FIG. 1 is a pictorial view of a shield for electronic components manufactured by the method of the invention;

FIG. 2 is a cross-sectional view of the shield shown in FIG. 1;

FIG. 3 illustrates a short piece of a striped laminate band from which the shield of FIGS. 1 and 2 is made; and FIG. 4 is a generally schematic flow diagram illustrating the use of the method of the invention to make the shield shown in FIGS. 1 and 2.

DESCRIPTION OF EXEMPLARY EMBODIMENT

The shield shown in FIGS. 1 and 2 of the drawing is, as far as its final physical form is concerned, very similar to shields presently used for a variety of purposes and electronic equipment. For example, such shields are used as housings for IF transformers in radio receivers, the housings being commonly referred to in the industry, and referred to hereinafter, as "IF" cans. Referring to FIGS. 1 and 2 of the drawing, an IF can, which is designated generally by the reference numeral 10, comprises a cup-like body portion 12 having a hole 14 in the top through which a tool can be inserted to adjust the transformer slug (not shown) and a pair of solder lugs 16, one of which extends from generally the center of each of two opposite side walls of the body 12 and parallel to the walls. The body 12 is constituted by a laminate portion of the band from which the IF can is formed (as described below) and includes a liner 18 of an electrically insulating material and an outer shell 20 of an electrically conducting material. The electrically insulating liner 18 of the body of the IF can covers all of the inside surface of the body within the electrically conducting shell 20, and the solder lugs 16 are integral with the shell 20, as will readily become apparent from the description below of the way in which the IF can is manufactured. It is important to observe that the electrically insulating liner 18 does not extend along the inner surfaces of the solder lugs 16, and therefore, a 360° solder joint around each solder lug 16 is ensured upon installation of the IF can on a circuit board or other mounting element.

Referring to FIG. 3, the IF can 10 is made from a band 22 comprising a strip 23 of an electrically conductive material, such as copper, and a strip 24 of an electrically insulating material, such as polytretafluoroethylene ("Teflon"), polyvinylflouride ("Tedlar") or polyethylene. The insulating strip 24 is centered on the conductive strip 23 so that the laminate constitutes a centrally located stripe along the band 22, and zones of conductive material only, each 3/16 inch wide, extend continuously along each edge of the band 22. The band 22 is preferably fabricated as a continuous strip of as much as several hundred feet in length. It may be made by laminating strips of material of widths equal to the final widths in the finished band or by laminating several strips of widths equal to the final widths of the stripes of laminate to a wide strip of the base material and then cutting the wide product to final width, each resulting band having one of the stripes of laminate. It is also within the scope of the invention to laminate strips of equal widths and then remove bands of one material to produce the laminate stripes.

There are various ways of shaping and blanking a strip to produce the IF cups. One way, as illustrated diagrammatically in FIG. 4, is to cut individual blanks from the band and conduct the blanks individually through a progressive deep-forming operation employing die sets, each of which involves drawing additional material of the laminate portion of the band into a cup form. The forming operation is controlled by way of the design of the dies such that the body of the cup is formed from the laminate portion of the band 22 so that the Teflon strip 24 ends up as the liner 18 in the cup. The initial blank may be oversized, and after the cup has been formed in the strip, the final cans are produced by cutting away the excess material (not shown) along the edges 30 of the cup. At the same time, the hole 14 is punched in top of the body 12 of the can and the solder lugs 16 are cut from the edges of the band using an appropriate cutting and punching die set. The final step is to bend the solder lugs so that they are co-planar with the side walls of the body, as illustrated in the last illustration of FIG. 4.

IF cups have been made in accordance with the method of the invention as follows: a band composed of a copper strip 23 of approximately 7 mils thickness and 1¼ inches wide and a Teflon Type C strip 24 approximately 1 to 2 mils thick and ⅞ inch wide are laminated using a modified epoxy adhesive, the Teflon strip being centered on the copper strip in the laminate. The copper and Teflon strips are supplied from rolls, and the lamination of the strips to produce the striped band 22 is carried out by applying a ½ mil coating of the adhesive onto one surface of the Teflon strip, conducting the strips together through a pressure nip between rolls heated to about 350°F. at a speed of approximately 10 feet per minute, thereby to produce an initial set in the adhesive, winding the band onto a core and curing the roll in an oven held at approximately 350° to 375°F. for from 1 to 2 hours. The band may be manufactured as a continuous length of several hundred feet using the exemplary method. The band is then made into IF cans in accordance with the blanking and forming procedure depicted in FIG. 4.

The above-described embodiment of the method of the invention and a typical product are merely exemplary. The invention is useful in the manufacture of a variety of products such as battery holders, transistor housings, lamp sockets, and insulating or shielding members for electronic and electric elements. Bearings having a structural body and selective bearing surfaces constituted by laminate portions of a continuous band of material from which the bearings are formed can also be readily manufactured by the method of the invention. Accordingly, numerous variations and modifications of the invention and various uses for it will be readily apparent to those skilled in the art without departing from the spirit and scope of the invention. All such variations, modifications and uses are intended to be included in the scope of the invention, as defined in the appended claims.

We claim:

1. A method of making housings for electronic components from sheet materials comprising the steps of forming a long band composed of at least a first strip of one sheet material and a second strip of a second sheet material laminated together, each strip being of uniform length, the first strip being wider than the second strip and the second strip being positioned on the first strip such that the band has at least one first longitudinally continual zone constituted by only the first strip of material and at least one second longitudinally continual zone constituted by a laminate of both strips, and forming a succession of articles from the band by shaping and blanking the band, the shaping and blanking being controlled to locate at least one mounting lug of each housing in the first zone of the band and a cup-like body of each housing in the second zone of the band.

2. A method according to claim 1 wherein the first strip is a metal and the second strip is a polymeric material.

3. A method according to claim 1 wherein the first strip is an electrically conductive metal and the second strip is an electrically insulating material.

4. A method according to claim 3 wherein, in the step of forming the band, the second strip is laminated to a medial portion of the first strip such that there are two first zones on the band, one extending longitudinally along each edge of the band and wherein, in the shaping and blanking step, each cup-like body is shaped and blanked exclusively in the second zone of the band with the strip of electrically insulating material located on the inside of the body, and at least one mounting lug is shaped and blanked exclusively in each of the first zones of the band.

5. A method according to claim 4 wherein the first strip is copper and the second strip is a fluorocarbon polymer.

* * * * *

Disclaimer 3,938,725.—*John H. Hardwick, William H. Jagoe, Carl W. Tonnesen*, Salem; and *Harold W. Jesse*, Amherst, N.H. METHOD OF MAKING ARTICLES SUCH AS ELECTRICALLY INSULATED HOUSING USING STRIPED LAMINATES. Patent dated Feb. 17, 1976. Disclaimer filed May 14, 1980, by the assignee, *TME Corporation*.

Hereby enters this disclaimer to all claims of said patent.

[*Official Gazette August 19, 1980.*]